US012634231B2

(12) United States Patent
Wheelock

(10) Patent No.: US 12,634,231 B2
(45) Date of Patent: May 19, 2026

(54) PRESERVATION OF PRIORITY TRAFFIC IN COMMUNICATIONS SYSTEMS

(71) Applicant: ARRIS Enterprises LLC, Suwanee, GA (US)

(72) Inventor: Ian Wheelock, Cork (IE)

(73) Assignee: ARRIS Enterprises LLC, Horsham, PA (US)

( * ) Notice: Subject to any disclaimer, the term of this patent is extended or adjusted under 35 U.S.C. 154(b) by 0 days.

(21) Appl. No.: 18/371,976

(22) Filed: Sep. 22, 2023

(65) Prior Publication Data

US 2024/0129229 A1    Apr. 18, 2024

Related U.S. Application Data

(63) Continuation of application No. 17/688,540, filed on Mar. 7, 2022, now abandoned.

(60) Provisional application No. 63/161,850, filed on Mar. 16, 2021.

(51) Int. Cl.
H04L 45/42 (2022.01)
H04L 45/00 (2022.01)
H04L 45/74 (2022.01)

(52) U.S. Cl.
CPC .............. H04L 45/42 (2013.01); H04L 45/38 (2013.01); H04L 45/566 (2013.01); H04L 45/74 (2013.01)

(58) Field of Classification Search
CPC ....... H04L 45/42; H04L 45/38; H04L 45/566; H04L 45/74; H04L 45/7453; H04L 47/28; H04L 49/208; H04L 47/11
See application file for complete search history.

(56) References Cited

U.S. PATENT DOCUMENTS

| | | | |
|---|---|---|---|
| 6,788,647 B1 * | 9/2004 | Mohaban | H04L 47/10 |
| | | | 370/235 |
| 7,050,396 B1 * | 5/2006 | Cohen | H04L 47/2408 |
| | | | 709/228 |
| 8,693,470 B1 * | 4/2014 | Maxwell | H04L 45/302 |
| | | | 709/203 |
| 9,935,885 B1 * | 4/2018 | Shen | H04L 45/64 |
| 9,942,161 B1 * | 4/2018 | Chen | H04L 47/2491 |
| 10,404,582 B1 | 9/2019 | Morris | |
| 10,411,998 B1 * | 9/2019 | Morris | H04L 45/22 |

(Continued)

FOREIGN PATENT DOCUMENTS

| WO | 9953648 A2 | 10/1999 |
|---|---|---|
| WO | 0115386 A2 | 3/2001 |

OTHER PUBLICATIONS

International Search Report and Written Opinion in International Patent Application No. PCT/US2022/019201 dated Jun. 14, 2022.

(Continued)

*Primary Examiner* — Chris Parry
*Assistant Examiner* — Dixon F Dabipi
(74) *Attorney, Agent, or Firm* — Chernoff, Vilhauer, McClung & Stenzel, LLP

(57) ABSTRACT

Systems and methods for restoring lost or corrupted data in packets that traverse a packet-switched network. In some embodiments, a device at the edge of a packet switched network may restore data that was originally inserted in a packet header by a sender, but overwritten or bleached during transport over a network by identifying an associated packet, and transferring a value from the associated packet to the packet.

6 Claims, 10 Drawing Sheets

(56) References Cited

U.S. PATENT DOCUMENTS

| | | | |
|---|---|---|---|
| 2004/0165528 A1* | 8/2004 | Li | H04L 47/15 |
| | | | 370/468 |
| 2008/0089324 A1* | 4/2008 | Polk | H04L 69/22 |
| | | | 370/389 |
| 2012/0069845 A1* | 3/2012 | Carney | H04L 63/1466 |
| | | | 370/392 |
| 2013/0128885 A1* | 5/2013 | Kardashov | H04L 12/56 |
| | | | 370/389 |
| 2013/0155849 A1* | 6/2013 | Koodli | H04L 45/308 |
| | | | 370/230 |
| 2015/0200861 A1* | 7/2015 | Lee | H04L 67/02 |
| | | | 709/203 |
| 2015/0304228 A1* | 10/2015 | Pasini | H04L 41/0816 |
| | | | 370/395.42 |
| 2016/0337251 A1* | 11/2016 | Venkataramanan | |
| | | | H04L 47/2441 |
| 2020/0359255 A1* | 11/2020 | Yan | H04L 45/64 |

OTHER PUBLICATIONS

The Design and Implementation of a Scheduling Mechanism of a Differentiated Services Based on Priority Pei-zhi Liu, Jia-li Miao; Sheng-qing Dai 2009 WRI International Conference on Communications and Mobile Computing Year: 2009, vol. 2, Conference Paper, Publisher: IEEE (Year: 2009).

* cited by examiner

```
Pseudo-code pkt=Rx_pkt()

hash1, hash2 = Hash_Function2( pkt, dir )

Flow_entry = NULL bidir_entry = NULL

/* is this a new hash/flow_entry ? */

If( ( Flow_entry = flow_lkup( hash2 )) == NULL ){

Flow_entry = alloc_flow_entry()

/* is there an existing bidir entry */ if( (bidir_entry = bidir_lkup( hash1 )) == NULL ){ bidir_entry = alloc_bidir_entry()

if( dir == US ){ if( pkt.fl == CS_PRIO){ bidir_entry.us_fl = pkt.fl bidir_entry.us_dscp = pkt.dscp

} if( pkt.tcp.flags == "SYN" ){ bidir_entry.tcp_ts=CURR_TIME

}

}else{  /* if( dir == DS ){ pkt.fl == bidir_entry.us_fl pkt.dscp == bidir_entry.us_dscp if(pkt.tcp.flags == "SYN_ACK" ){ bidir_entry.tcp_irtt = CURR_time - bidir_entry.tcp_ts

}

}

}

/* flow_entry with same hash1 point to same
        bidir_entry */

Flow_entry.bidir_ref = bidir_entry

}

Flow_entry.hash1 = hash1 slowpathProPkt( pkt, Flow_entry )

install_flow_entry( Flow_entry, hash1 )

} else { fastpathProcPkt( pkt, Flow_entry )

PRESERVATION OF PRIORITY TRAFFIC IN COMMUNICATIONS SYSTEMS

CROSS REFERENCE TO RELATED APPLICATIONS

This application is a continuation of U.S. patent application Ser. No. 17/688,540 filed on Mar. 7, 2022, which claims the benefit of U.S. Provisional Patent Application Ser. No. 63/161,850 filed Mar. 16, 2021.

BACKGROUND

The subject matter of this application generally relates to the provision of Internet traffic through CATV or other communications networks.

In packet-switched networks such as the Internet, network reliability can be degraded in several manners, including packet loss when the network drops packets due to congestion, as well as latency which represents the delay time it takes for a packet to traverse the network and the various queues in which the packets are held. To manage these various issues, data providers implement Quality of Service (QoS) protocols that either prioritize among traffic or guarantee a certain level of performance to a data flow.

One such protocol implements a Differentiated Services (DiffServ) architecture that uses a field in IP packet headers to mark individual packets with a priority code, called a DSCP value. Based on the DSCP value, routers and switches use various scheduling strategies to tailor performance to expectations. Stated simply, the DSCP value indicates a priority for the packet, and packets marked with higher priorities are given scheduling precedence in the network to more quickly and reliably deliver the packet through the network.

While other QoS architectures are possible, these are often unwieldy as they require that prioritized traffic be identified using e.g., the IP addresses and ports involved in the priority communications. With DSCP classification, prioritization is simplified as there is no need to be keep track of IP Addresses or TCP/UDP Port values, as a single value can be written into the basic configuration file for a device to map traffic marked with a particular DSCP value to a specific service flow.

Preserving DSCP markings attached to packets as they traverse the network is essential for effective implementation of a DiffServ architecture. Unfortunately, the DSCP marking are frequently rewritten to a new priority, or sometimes zeroed out (referred to as "bleaching") during transit due to the packet headers being processed by network devices that are DiffServ-unaware.

What is desired, therefore, are systems and methods that better preserve priority information attached to packets that traverse a network.

BRIEF DESCRIPTION OF THE DRAWINGS

For a better understanding of the invention, and to show how the same may be carried into effect, reference will now be made by way of example to the accompanying drawings, in which:

FIG. 11 shows pseudocode that implements the procedure of FIG. 7.

DETAILED DESCRIPTION

Figure 1:
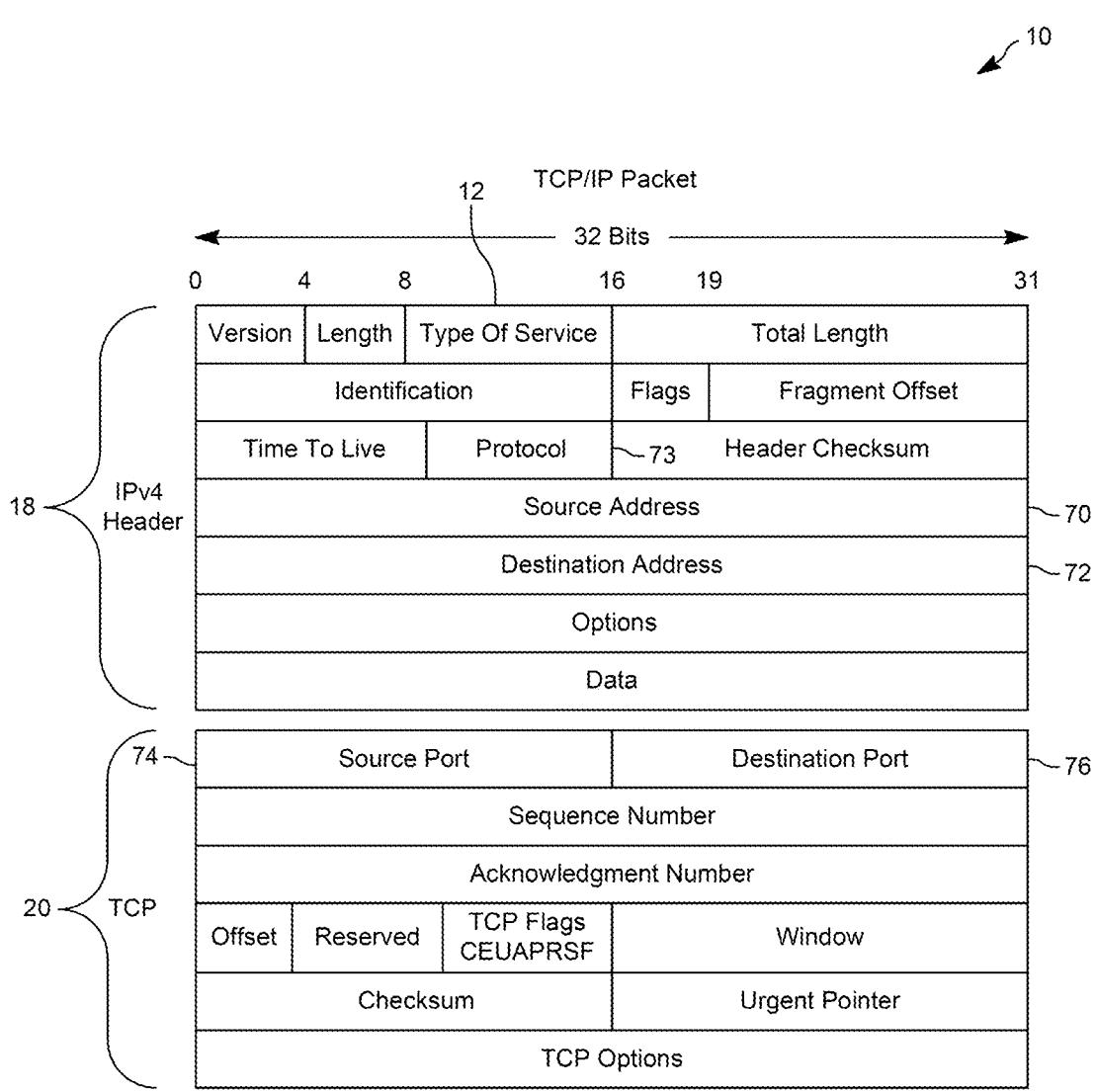
FIG. 1 shows an exemplary header for a TCP-IP packet using the IPv4 protocol, having a Type of Service (ToS) field.

As previously noted, some Quality of Service (QoS) protocols for communications networks implement a Differentiated Service (DiffServ) solution that stores a value in the IP header of a data packet to indicate the priority a network should allocate to the packet relative to other packets. FIG. 1, for example, shows an exemplary TCP/IPv4 packet 10 that includes an IP header 18 and a TCP header 20. The IP header 18 includes a Type of Service (ToS) field 20. The ToS field 20 is an 8-bit identifier that was originally intended to store a six-bit value where the first three bits specified a precedence or importance value, the next three bits each specified a normal or improved handling for delay, throughput, and reliability, respectively, and the last two bits were reserved. In practice, however, the first three bits assigned for precedence were never used. Later, the DiffServ architecture specified the use of the ToS field to store a 6-bit code that indicates the precedence for a packet. The remaining two bits of the 8-bits are used to signal congestion control, defined by RFC3168. These bits may be modified by middle-boxes (or intermediary routers) and are used to signal congestion that may occur across the end-to-end path. The following table shows common code values and their meanings.

TABLE 1

| DSCP value | Description (RFC 4594 [21]) | WebRTC [4] Flow Type/Priority |
|---|---|---|
| CS1* | Low-priority data | Any/Very Low |
| AF42* | Multimedia conferencing | 1/Medium or High |
| EF* | Telephony | 1/Medium or High |
| CS0 | Standard | Any/Low |
| AF11, AF12, AF13 | High-throughput data | 4/Medium (AF11 only) |
| AF21 | Low-latency data | 4/High |
| AF31 | Multimedia streaming | 3/High |
| AF41 | Multimedia conferencing | 2/High |
| CS4 | Real-time interactive | not defined |
| CS5 | Signaling | not defined |
| CS7 | Reserved for future use | not defined |
| 1, 2, 4, 6, 41 | Undefined values | not defined |

Under the DiffServ architecture, packets are marked either by the traffic sources themselves or by edge devices where the traffic enters the network. In response to these markings, routers and switches use various queuing strategies to tailor performance to requirements. Routers and switches supporting DiffServ configure their network scheduler to use multiple queues for packets awaiting transmission from bandwidth-constrained interfaces. Router vendors provide different capabilities for configuring this behavior, to include the number of queues supported, the relative priorities of queues, and bandwidth reserved for each queue. For example, some services require low jitter and low latency—e.g., Voice-over-IP (VOIP) and these packets are prioritized using the DSCP field. When such a packet must be forwarded from an interface with queuing, it is given priority over lower priority packets, for example those tagged as merely "best effort" in the DSCP field.

As also noted previously, however, often the 6-bit DSCP values are overwritten with other values, or simply zeroed out (bleached). This phenomenon occurs due to the differing treatment accorded to the ToS field by various network components. For example, some equipment might still be configured to use outdated semantics for the ToS field. Alternatively, incorrect router configurations may alter values in a ToS field. One estimate indicated that up to one-fourth of IPv4 routers re-marked DSCP values, with a significant number of those exhibiting bleaching, and others even inverting the priority specified in the DSCP field. Such behavior may obviously lead to severe disruption of priority traffic.

Figure 2:
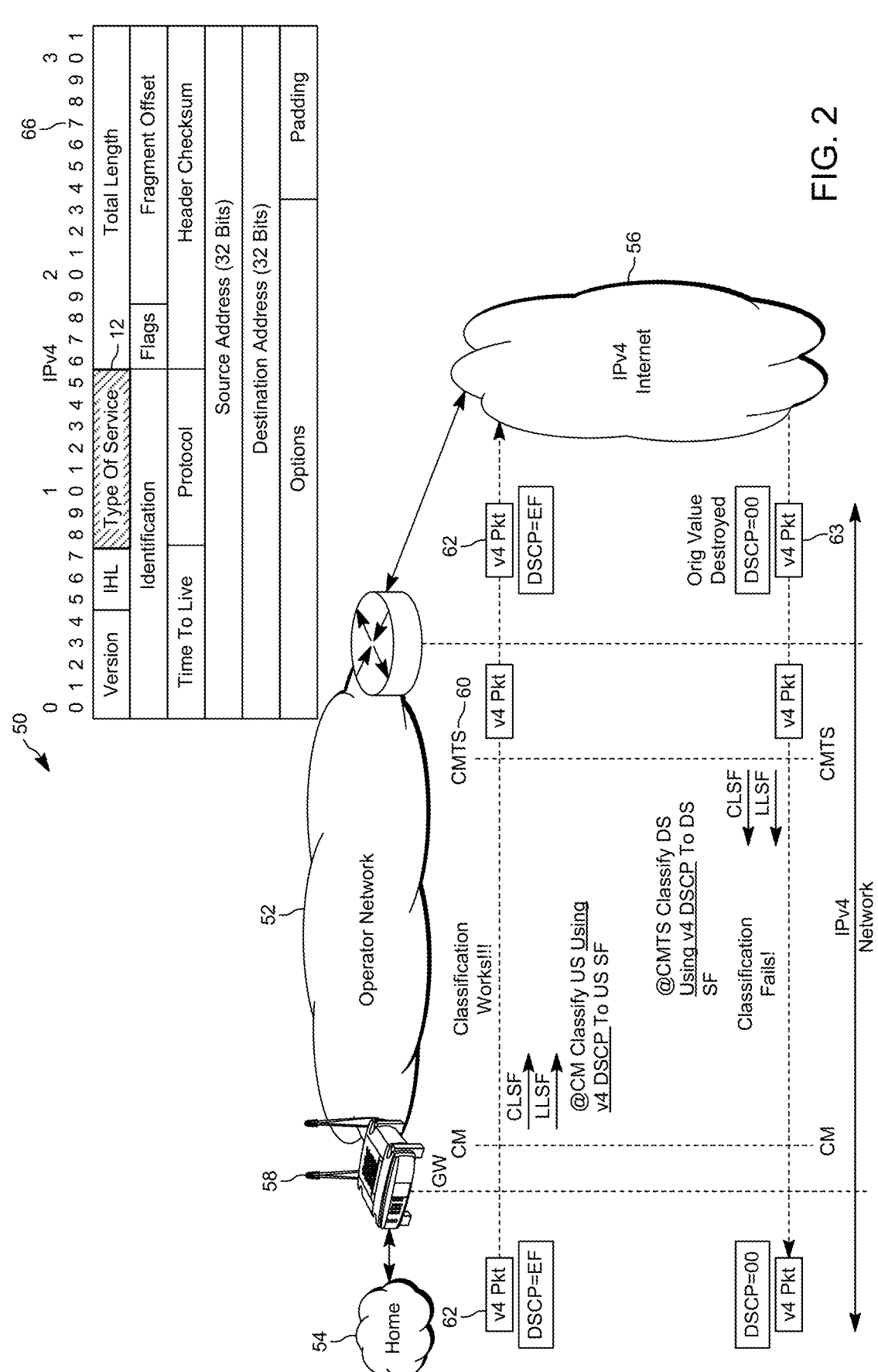
FIG. 2 shows an exemplary communications network where the classification information in the ToS field of FIG. 1 is prone to being overwritten.

Referring to FIG. 2, for example, a communications network may comprise an operator network 52 that routes traffic between a home 54 and the Internet 56. The exemplary network of FIG. 2 may utilize IPv4 traffic, or alternately any other suitable protocol that implements DSCP fields in packet headers such as IPv6 etc. The operator network 52 is shown for exemplary purposes as a Hybrid Fiber Coax (HFC) network of a Cable TV (CATV) provider where data is transmitted over the operator network between a cable modem and/or gateway 58 at a subscribers premises and a CMTS 60, typically at a head end of the operator, but those of ordinary skill in the art will appreciate that other topologies may also benefit from the disclosure provided herein, such as Distributed Access Architectures where, e.g. a Remote MACPHY or other edge device relays traffic to and from the Internet or other packet-switched network as well as other architectures including all-optical networks such as Fiber to the Premises (FTTP), wireless networks, etc.

Assume that in the communications network of FIG. 2, the resident of the home 54 is exchanging priority traffic with another user via the Internet. The priority traffic may be VOIP traffic, gaming traffic for which low latency is desired, or other such traffic where the applications providing these services mark the ToS fields of their respective communications with values for the data being exchanged. Thus, in this architecture, an IPv4 packet 62 may be assembled and assigned a DSCP priority value "EF" that is inserted into the ToS field 12 of packet header 66. The packet 62 is then communicated to the operator network 52 through gateway 58, and from the operator network 52 to the Internet 56 via CMTS 60. Throughout this portion of the process, the network 52 is most always able to retain the DSCP value inserted into the header of the packet 62. But once the packet 62 is released into the Internet, the DSCP value may be modified or bleached before receipt by the operator network 52 or other network servicing the intended recipient of the packet 62, and this can unduly delay delivery of the packet 62 to the intended recipient.

This can be seen in the reverse flow from the Internet 56 back to the home 54. Applications that require prioritization typically involve two-way communications, e.g. VoIP, gaming applications, video conferencing, etc. Thus, the packet 62 sent to a recipient will generate an associated return packet 63 that also would have been assembled with a DSCP field value, typically identical to that of packet 62, i.e. "EF"

in this instance. Again, however, because the packet-switched Internet network is prone to overwriting or bleaching that value, the proper classification fails; the CMTS 60 receives the incorrect DSCP value of "00" and therefore does not prioritize the packet during transport in the operator network 52, potentially leading to delays.

Figures 3, 4:
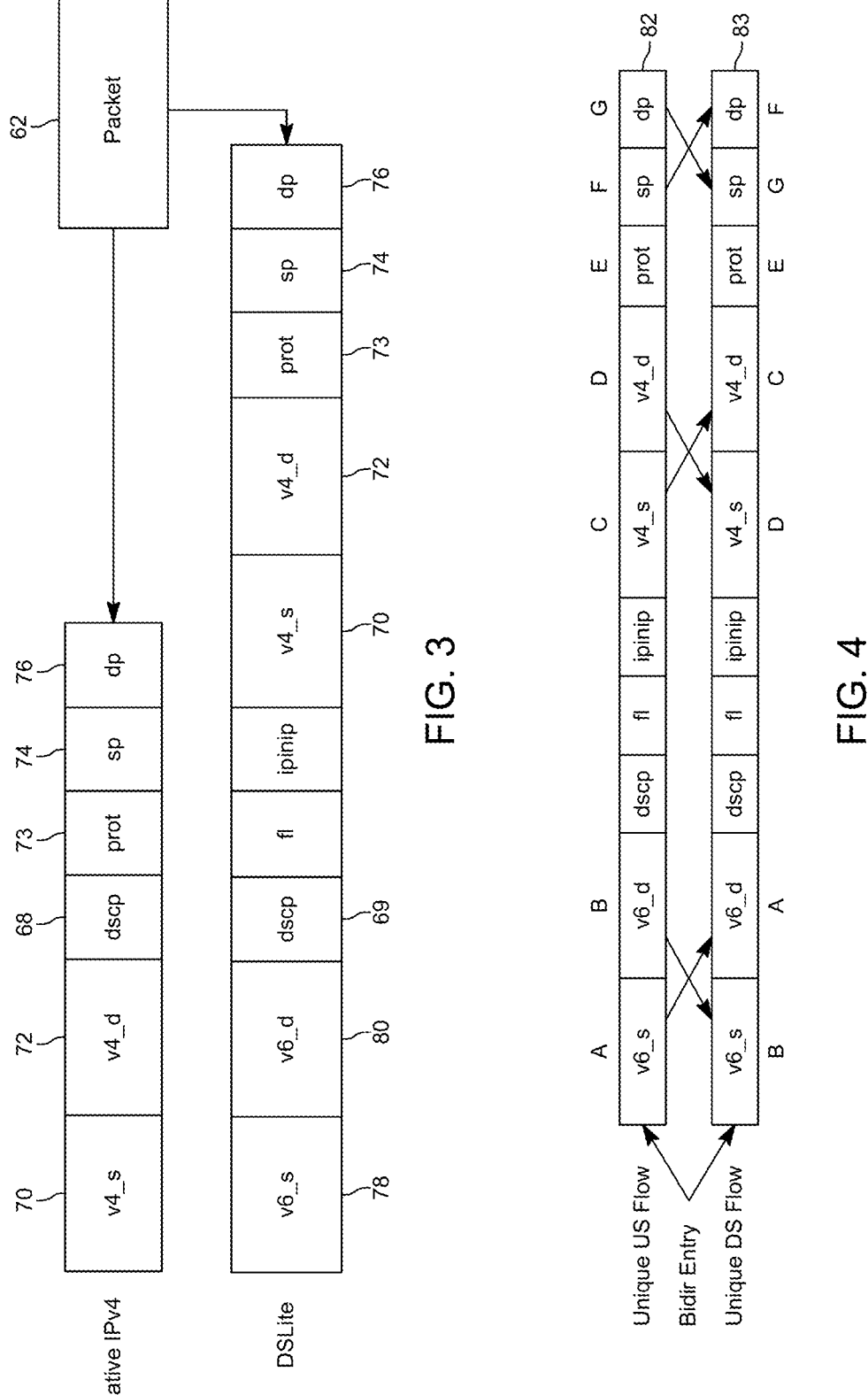
FIG. 3 shows exemplary fields of IPv4 and DS-Lite compliant IPv6 packets, respectively.
FIG. 4 shows an exemplary process of mirroring some of the fields in the packets shown in FIG. 3.

The present specification discloses novel systems and methods for an operator network that receives packets communicated via the Internet or other packet-switched network to recover values originally inserted into DSCP fields, even when those values were modified or bleached while traversing the packet switched network. Specifically, as noted earlier, applications that require prioritization typically involve two-way communications, in which an initial packet sent from a first device to a second device will quickly generate a responding packet from the second device to the first device. Each of these devices have respectively unique IP/port address combinations that are recorded in both the initial packet and the responding packet. FIG. 3, for example shows a packet 62 that may be assembled with fields 68 either specified by the IPv4 and IPv6 protocols, or with fields 69 of the DS-Lite IPv6 protocol. If assembled according to the IPv4/IPv6 protocols, the header of the packet 62 will include a source IP address (SIP) field 70, a destination IP (DIP) address field 72, a source port (SPORT) field 74, and a destination port (DPORT) field 76. If assembled in accordance with DS-Lite IPv6, the header of the packet will include source and destination IP addresses for both IPv4 and IPv6 protocols as well as the source and destination port addresses, i.e. 4SIP, 4DIP, 6SIP, 6DIP, SPORT, and DPORT. Each packet also includes other fields/values such as the Protocol (PROT) value 73 along with values in other fields.

Referring to FIG. 4, when an initial packet 62 is transmitted in an upstream direction from source device 58 (e.g., a cable modem and/or gateway) to a destination, and a response packet 63 is received from the destination to the source 58, a relationship between the fields described in the preceding paragraph can be easily seen. Specifically, the SIP/DIP combination(s) of the packets 62 and 63 will be mirrored, as will the SPORT/DPORT combination. In other words, the values ABCDEFG in field tuple 82 of packet 62 as shown in the figure are simply rearranged in the order BADCEGF of the tuple 83 of packet 63. Also, as noted earlier, the response will typically be returned in a short amount of time. This means, that upon receipt of the packet 62, the CMTS 60 or other edge device in the operator network 52 can predict receipt of a response packet with known values for the source and destination IP addresses and source and destination ports.

Figure 5:
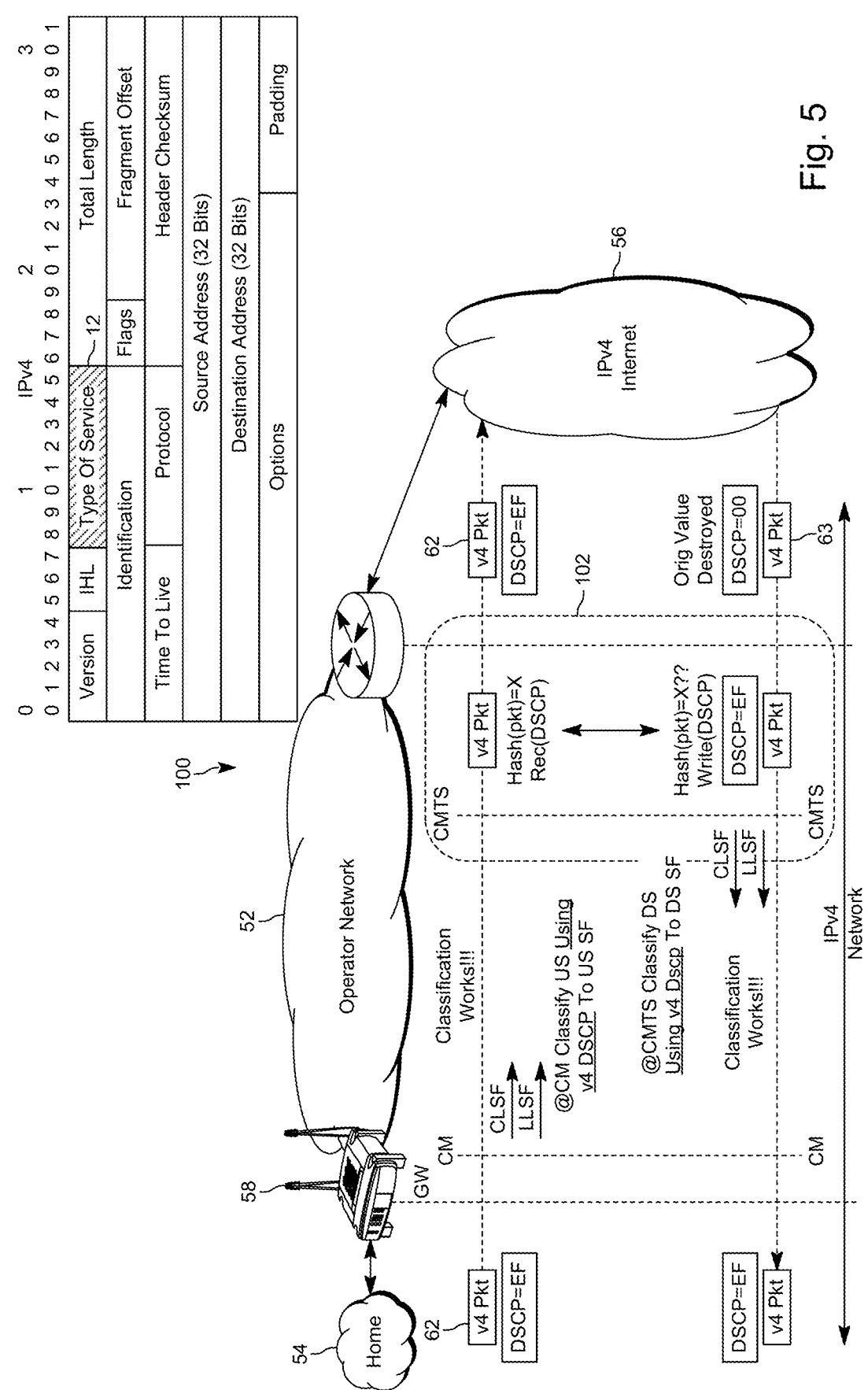
FIG. 5 shows a system that uses the process of FIG. 4 to recover lost or modified values of the ToS field.

Referring to FIG. 5, an improved system 100 may include a CMTS 102 or other device at the edge of the network 56 capable of recovering lost DSCP values. A source device at home 54 may be in communication with a destination device at a location (not shown) via the Internet 56, and the communications between these devices may require assignment of a specified level of priority. Accordingly, upstream packet 62 may be assembled—in this example according to the IPv4 protocol—and a DSCP value of "EF" inserted into the ToS field 12, which as noted in Table 1 specifies telephony service with a priority of medium or high. The packet 62 with this DSCP value is forwarded to the gateway 58 and on to the CMTS 102.

The CMTS 102 parses the packet header to retrieve the tuple 82 shown in FIG. 4, which since it is an IPv4 header, has values represented as CDEFG in this figure for the 5-tuple source/destination IP addresses, PORT, and source/ destination port addresses, respectively. Those of ordinary skill in the art would appreciate that if IPv6 were to be used instead of IPv4, the tuple 82 would have seven values in the tuple, specified by ABDCEFG. After retrieving the tuple CDEFG, the CMTS 102 mirrors the tuple as described with respect to FIG. 4, i.e. it produces a mirrored tuple DCEGF, which represents the expected source/destination IP addresses and port addresses of a packet 63 sent in the downstream direction in response to the packet 62. The CMTS may preferably perform a hash of the mirrored tuple DCEFG and store the hash value along with the DSCP value "EF."

As with the example described with respect to FIG. 2, the packet 62 may be sent to the destination, which will in turn respond with a downstream packet 63, and that downstream packet 63 should also have an appended DSCP value of "EF" in the header. However, the DSCP value may be overwritten or bleached during transport via packet-switched network 56, as is shown in FIG. 5 as an incorrect DSCP value of "00." Unlike the system of FIG. 2, however, upon receipt of packet 63 the CMTS 102 parses the packet header, retrieves the tuple DCEFG shown in FIG. 4, and performs a hash operation on it. The CMTS 102 compares that hash to the stored, mirrored hash of packet 62 and recognizes it as a response to the packet 62. The CMTS 102 then replaces the DSCP value of "00" in the header of packet 63 with the stored value of "EF" and forwards it on through the operator network 52, which will then recognize the proper priority assigned to the packet.

Those of ordinary skill in the art will appreciate that the foregoing process may be easily modified by having the CMTS 112 hash the fields CDEFG of the upstream packet 62 without mirroring but process the downstream packet 63 by first mirroring the source and destination IP/port address fields as previously disclosed, then hashing those fields. In either circumstance the CMTS 102 will be able to match the upstream packet 62 with the response packet 63.

In some embodiments, the CMTS 102 may append a time counter or threshold to the stored DSCP values and their associated hashes. As already noted, in typical priority upstream packets receive responsive downstream packets within a short period of time, which may be on the order of milliseconds. Thus, in some embodiments, the DSCP values and their associated hashes may expire if a response is not received within a specified time. Such embodiments may ensure that the wrong DSCP values are not replaced into a ToS field 12.

Preferably, the foregoing processing is only performed once per IP flow per direction (upstream/downstream). A flow is a sequence of packets that are sent from a particular source to a particular, unicast or multicast, destination. Thus, the initial packet 62 and the response packet 63 would typically be the first packets in ongoing respectively paired IP flows, with every packet of each flow subject to the same priority. Therefore, in a preferred embodiment, in addition to recording a DSCP value and an associated mirrored hash for the initial packet 62, the CMTS may also generate a first flow ID to identify all ongoing upstream packets exchanged in the prioritized IP flow between the source device at the home and the CMTS, and would similarly generate a second flow ID to identify all ongoing downstream packets exchanged in the prioritized flow between the CMTS and the destination device. After the initial processing (slow path processing) generates the mirrored hash value and the associated DSCP value, each are associated with the identified upstream flow ID so that subsequent upstream packets identified with the same flow ID can simply be processed without additional hashing, recording of DSCP values, etc. (fast path processing). Similarly, once the downstream flow ID is generated, that flow ID may be used to associate packets in that flow with the proper DSCP value. In some situations, the CMTS 102 may receive response packet 63 before it has finished the slow path processing, and before it has recorded a DSCP value for possible replacement into the packet 63. However, once the slow path processing is completed by CMTS 102, all other packets exchanged in the IP flow will have the proper DSCP packet inserted.

Those of ordinary skill in the art will also appreciate that upstream packets 62 may also have had their DSCP headers bleached or otherwise modified upon delivery to the recipient through the packet-switched network 56. However, where the recipient is also connected to the network 56 via the operator network 52, or another operator network that uses the systems and methods described herein, these DSCP values may be restored because, upon receipt of the first packet 62, the response packet 63 will include a proper DSCP value in the ToS field 12, and that value will be recorded at the edge of the operator network so that subsequent packets from the home 54 may have the proper DSCP value reinserted where necessary.

Figure 6:
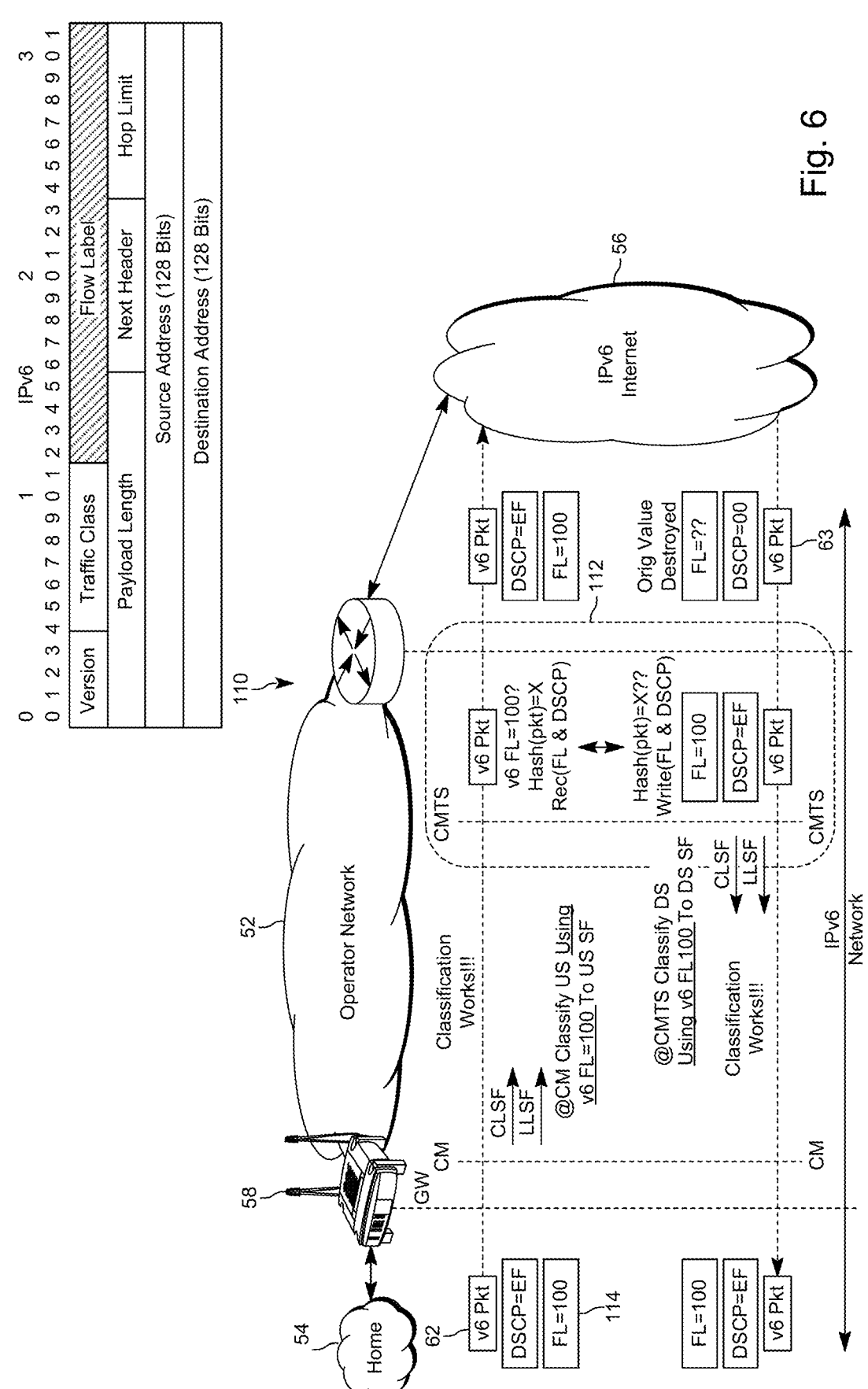
FIG. 6 shows an alternate embodiment of the system of FIG. 5 that includes a Flow Label value.

FIG. 6 shows an alternate system 110 by which a CMTS 112 makes use of a 20-bit Flow Label field 114 implemented in the IPv6 protocol. Specifically, a cable modem or other device may insert a specific value into an assigned bit of the Flow Label field 114 of outgoing IPv6 packets. In this embodiment, this bit would signal whether such traffic must have its DSCP value recorded by the CMTS 112, along with the hashed and mirrored tuple information as described above. In this manner, the CMTS 112 or other device can quickly segregate important traffic that requires special handling (slow path processing) and the remainder of the traffic that does not.

Moreover, in an additional or alternate embodiment, the remaining bits of the Flow Label field 114 may be used by CMTS 112, gateway 58, or other device to provide more granular handling or control of packets. This approach permits the use of simplified classifiers based on the IPv6 Flow Label value, that can be used to apply to both upstream and downstream traffic.

The CM/GW can set a Flow Label value in outbound packets so they may be passed for classification/QoS based on the flow label. Once the upstream DSCP values are recorded based on the flow label, the IPv6 packet is forwarded to the CMTS where the previously described scheme involving dynamically created mirror classification is applied for those packets carrying a Flow Label, where the CMTS associates the packet with a mirrored hash, the flow label, and the DSCP value. The returning downstream traffic is unlikely to have an IPv6 Flow Label value filled out, so the CMTS performs traffic identification based on the mirrored hash value as described earlier. Any matching traffic has its associated upstream information retrieved, including the original IPv6 Flow Label. The CMTS applies this value to the packet before sending on for DOCSIS classification/QoS handling. The overwritten IPv6 Flow Label in the modified packet is matched by the downstream classifier, ensuring that it is properly classified to the appropriate service flow for QoS.

In some embodiments, because the flow label value 114 provides greater granularity of treatment of packet priority than does a DSCP value, the presence of a flow label value 114, with its classifier and associated code, may supplant any treatment specified by a DSCP value in the ToS field 12. Thus, in some implementations the CMTS 112 may have a policy to either retain or overwrite a DSCP value received in a downstream packet. Moreover, in some embodiments, the CMTS may use different flow labels between the home 54 and the CMTS 112 than between the CMTS 112 and the CMTS 112 and the Internet.

The modification of the DSCP and Flow Label values may preferably be performed as part of the slow-path processing of the initial packets of a flow, before performing the required configuration to enable the eventual rewrite to be performed by fast-path processing.

Figure 7:
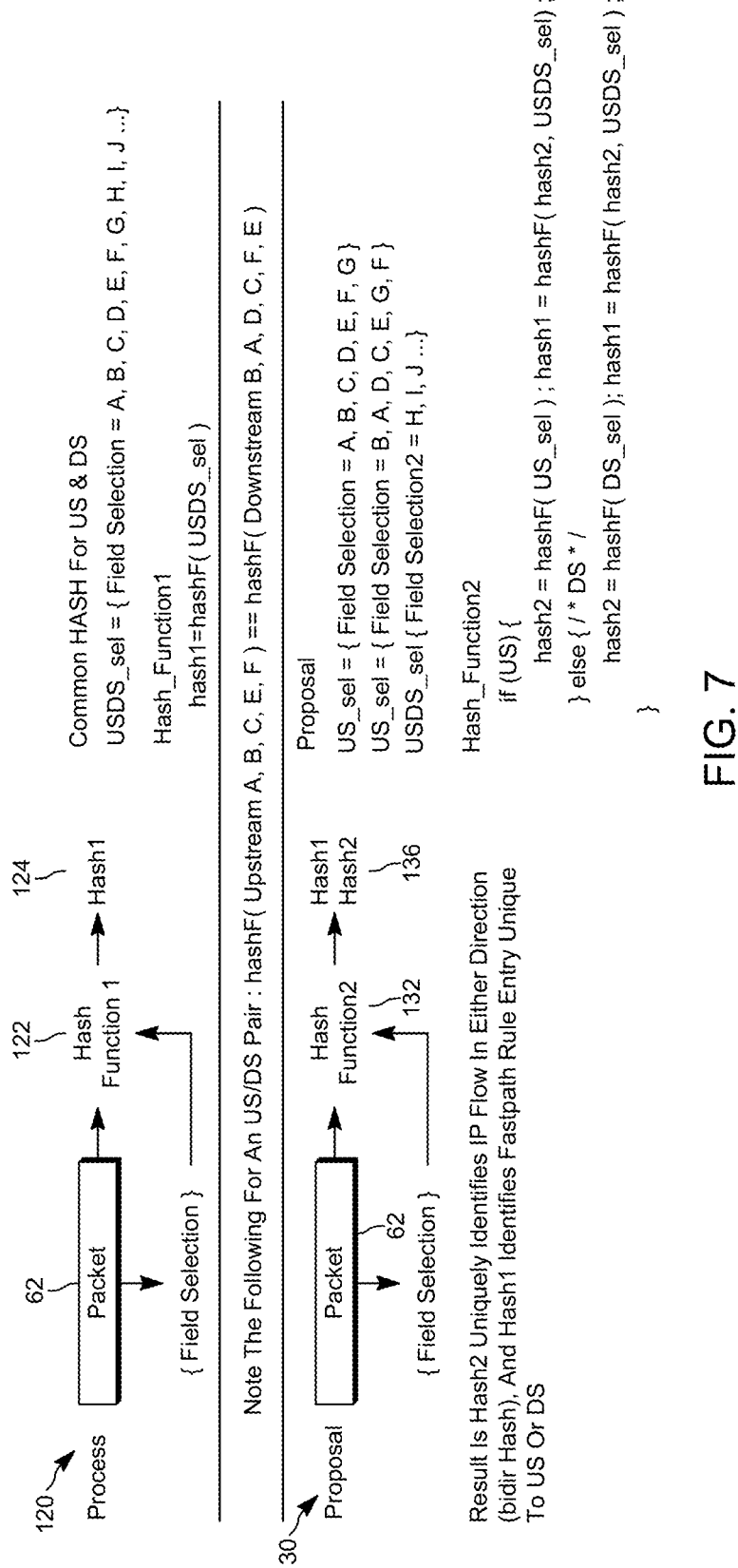
FIG. 7 shows an exemplary method of hashing the fields of FIG. 3 to produce a unique identifier for a flow in an efficient manner.

Regardless of whether an implementation uses the flow label field of the IPv6 protocol, as noted earlier the CMTS 102 of FIG. 5 and/or the CMTS 112 of FIG. 6 preferably identifies a flow to which the DSCP values, Flow Label values, and mirrored hash values are appended in the slow path processing for later application in the fast path processing. Preferably, the flow ID is chosen randomly, in a "pseudo" manner, which makes any set of bits within the flow label field suitable for use as a hash key to look up data associated with the flow. Referring to FIG. 7, for example, a first process 120 may receive an initial packet 62 from which a flow ID is to be constructed. The packet 62 may comprise a number of header fields, such as the ten fields shown in the DS-Lite IPv6 header of FIG. 3. In this manner, these fields (A-J) may be selected and hashed with a hash function to produce respective hash functions 124 that serve as the flow ID for both the upstream and downstream directions, noting again that the source and destination IP/port address fields of the upstream packet 62 will either have to be mirrored before hashing, or the corresponding fields of downstream packets will need to be so mirrored before hashing so that the upstream and downstream hash values may be matched to each other.

The foregoing procedure will produce an appropriate unique flow ID, but it should be noted that performing hash operations is computationally expensive, and therefore performing a hash of one set of fields of a packet to produce a flow ID in the upstream and downstream directions, and performing a hash of a different set of fields to produce the hashed tuples 82/83 shown in FIG. 4—done to match the initial source packet 62 with a corresponding response packet, is not ideal. Accordingly, FIG. 7 also shows an improved process 122, which takes advantage of the fact that the source and destination IP/port address fields of the upstream packet 62 and downstream packet 63 were already hashed, and therefore do not have to be individually hashed twice. Instead, their previously-computed hashed value may simply be hashed with the remaining fields of the tuples 82/83 shown in FIG. 4. Thus, the when the CMTS 102 or 112 receives the initial upstream packet it only selects the remaining fields that are to be used for the upstream flow ID—e.g., fields H, I, and J of the exemplary DS-Lite IPv6 header. In the upstream direction, the hash function 132 is applied to the combination of those fields with the previously-hashed (possibly mirrored) tuple 82 to produce the unique flow ID. The same process occurs in the downstream direction for packet 63; the downstream flow ID is reconstructed by applying the hash function 132 to the combination of fields H, I, J with the same hash of tuples 83 that was used to match DSCP fields. By reusing the first hashed value, the second has operation is less computationally expensive. FIG. 11 shows exemplary pseudocode for implementing the foregoing procedure.

Figure 8:
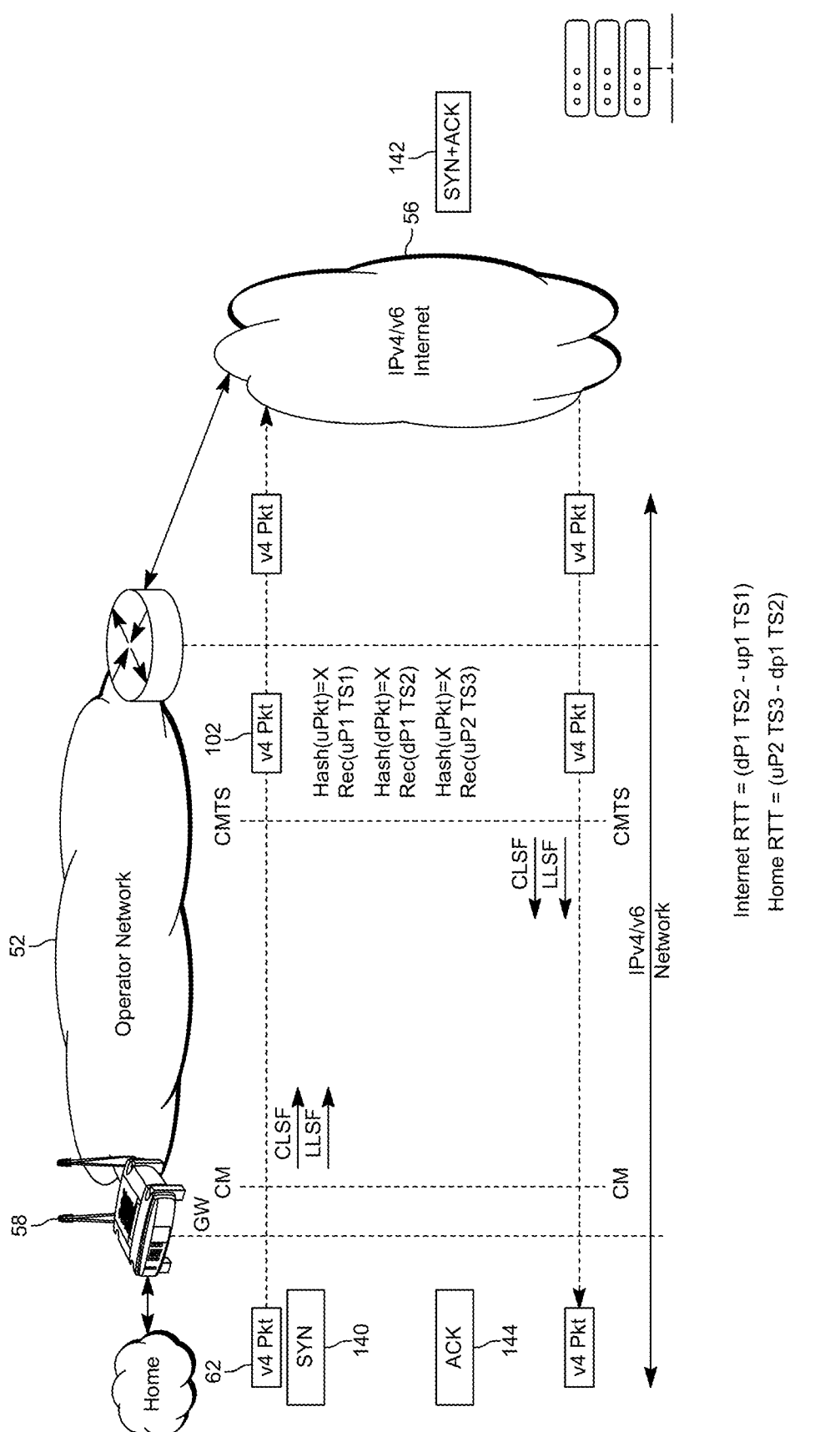
FIGS. 8-10 shows an exemplary method to recover round-trip timing data using the system of FIG. 5.
Figure 9:
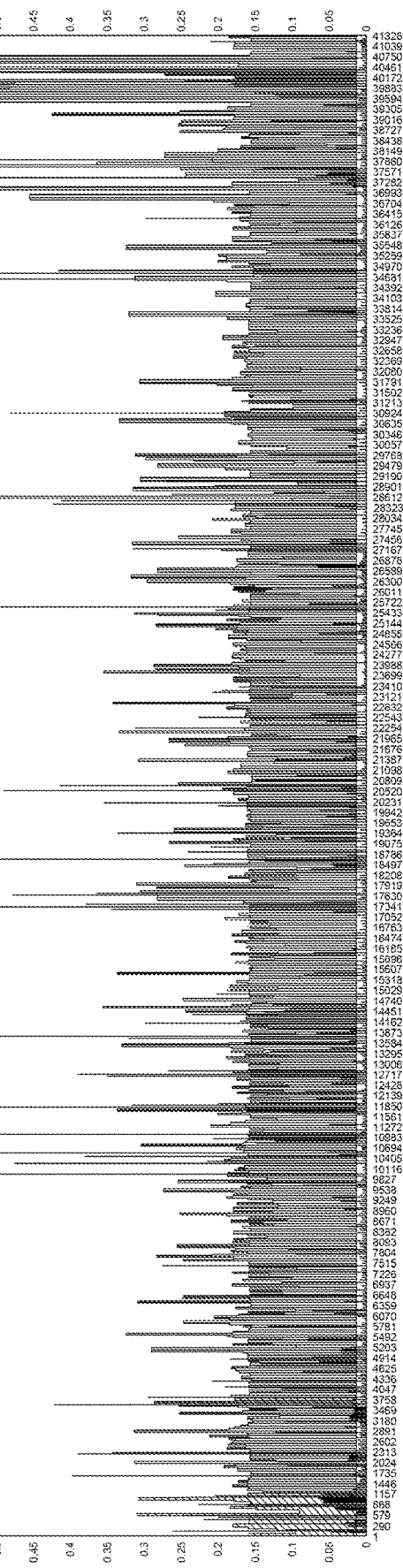
Figure 10:
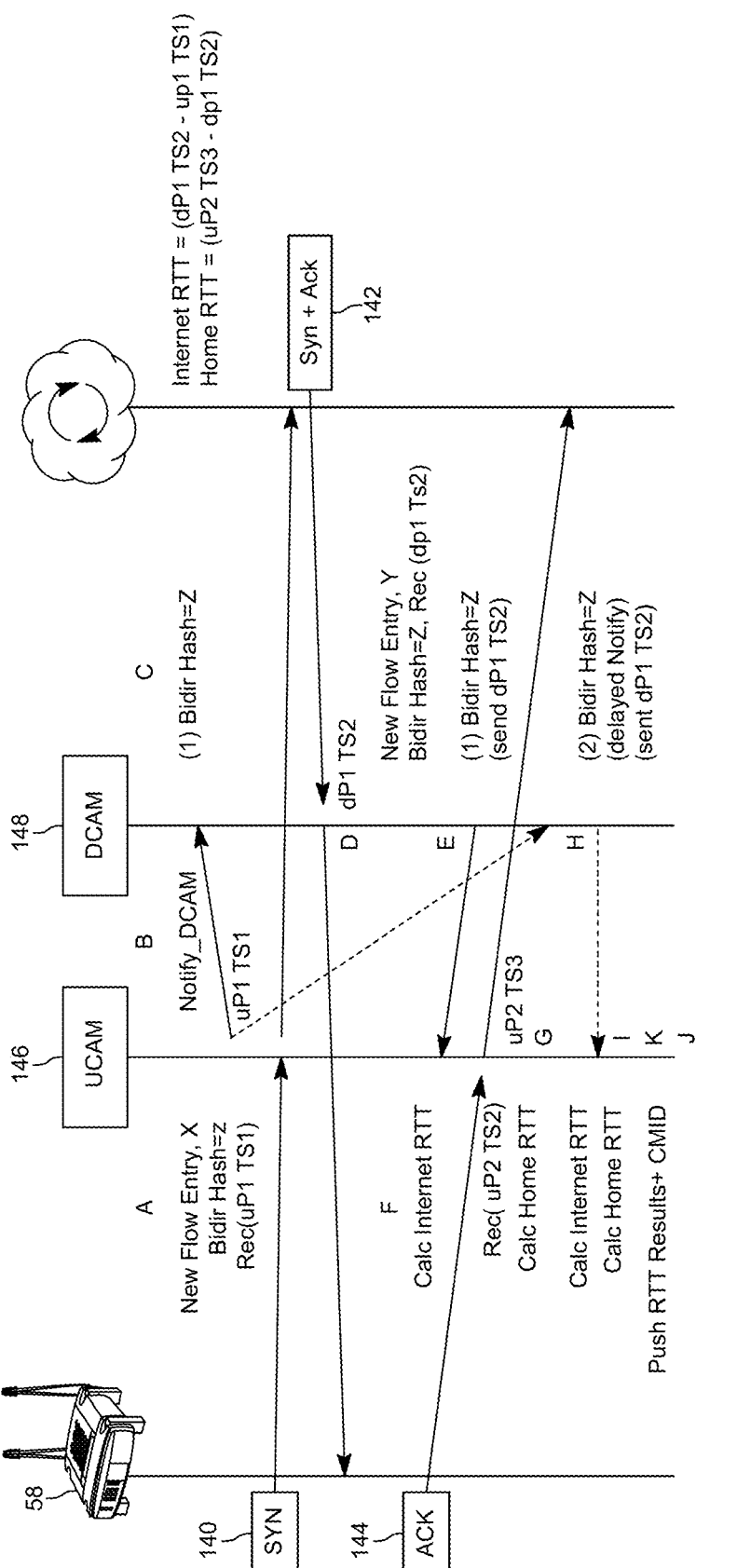

FIGS. 8-10 show an exemplary feature of the disclosed systems and methods where a CMTS 102 may calculate round trip times for packets to traverse the operator network 52 as well as the packet-switched network 56. FIG. 9 shows exemplary round-trip times recorded for operator networks versus the Internet, for example. These round-trip times may be of use in a number of applications. For instance, such data may be sent to an analysis module to determine the benefits achieved by low latency services sold, etc. Referring to FIG. 8, for example, in this embodiment the packet 62 may preferably be sent along with a sync message 140 to which the CMTS appends a first timestamp (uP1 TS1) indicating the time that the upstream packet 62 was received by the CMTS. The CMTS 102/112 then forwards the packet 62 to the Internet/packet switched network 56. Once received, the packet 63 may be sent to the CMTS along with an acknowledgement message 142, to which the CMTS may append a second timestamp (dP1 TS2) indicating the time the CMTS receives packet 63. Once the packet 63 is received by the cable modem/gateway 52, another acknowledgment 144 is sent to the CMTS which appends a third timestamp (uP2 TS3) to the acknowledgment 144. From these timestamps the values a round-trip time for operator network 52 may be calculated and a round-trip time for the packet-switched network 56 also calculated.

Referring to FIG. 10 for example, the CMTS 102, 112 may include an upstream line card 146 and a downstream line card 148. In process A, the upstream line card 146 may receive the sync message 140, calculate the bidirectional hash Z (the Flow ID), append its timestamp uP1 TS1 to the sync message, and in process B send flow ID to the downstream line card 148. The upstream line card also sends the packet 62 to its destination vis the Internet, and in process C, the downstream line card 148 records the flow ID by which it can identify the associated acknowledgement. Upon receipt of packet 62, the destination device (not shown) returns the acknowledgment 142 to which the downstream line card 148 appends timestamp dP1 TS2 in process D, and in process E forwards the timestamp dP1 TS2 to the upstream line card 146 along with the flow ID. The downstream line card 148 also forwards the packet 63 to the gateway 58. The upstream line card 146 can now calculate the Internet RTT in process F as the difference between the time stamps dP1 TS2 and uP1 TS1.

FIG. 10 also shows that the foregoing calculations do not change if the flow ID determination is delayed by the slow path processing because the timestamps associated with the packets 62 and 63 are still calculated as they are received. For example, assuming that the determination of flow ID "Z" is sufficiently delayed that the packet 63 had previously been received by the downstream line card 48 and forwarded to the gateway 58, the downstream line card can in process H simply send the previously-recorded time stamp dP1 TS2 at a later time, at which point in process I the line card 146 may simultaneously calculate both the Internet RTT as well as the operator network RTT. IN process J, these results may be pushed to an outside analysis module or other device that makes use of such information.

Those of ordinary skill in the art will appreciate that Note that it is possible that the forgoing functionality could be performed by a separate external device connected to the CMTS (if the CMTS did not support this functionality).

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. A device, that includes a processor, in a communications network, said device located in an operator network between a subscriber and a packet-switched network, said device capable of receiving upstream packets from said operator network for transmission to said packet-switched network and receiving downstream packets from said packet-switched network for transmission to said operator network, that receives a received first upstream packet from a local sender in said local network, the device configured to selectively use address contents included within the received first upstream packet to identify a subsequently received first downstream packet from a different sender than said local sender based upon said address contents, where said address contents includes a plurality of (i) source IP address (SIP) field for IPv4, (ii) a destination IP (DIP) address field for IPv4, (iii) a source port (SPORT) field, (iv) a destination port (DPORT) field, (v) source IP address (SIP) field for IPv6, and (vi) a destination IP (DIP) address field for IPv6, where said subsequently received first downstream packet was received in response to said received first upstream packet being provided to said different sender, said device configured in response to receiving said received first upstream packet storing at least a portion of said address contents and quality of service data associated with said received first upstream packet, and further generating an upstream flow identifier (ID) associated with subsequently received upstream packets from said local sender, said device configured in response to receiving said subsequently received first downstream packet from said different sender to identify said subsequently received first downstream packet based upon comparing address contents included within said subsequently received first downstream packet with said stored address contents from said received first upstream packet and to write said quality of service data corresponding to the received first upstream packet to the subsequently received first downstream packet from said different sender, said device in response to receiving said subsequently received first downstream packet generating a flow identifier (ID) associated with different subsequently received downstream packets from said different sender sent in response to subsequent upstream packets from said local sender, said device configured based upon identifying said downstream flow identifier (ID) in a subsequent downstream packet of said different subsequently received downstream packets to write said quality of service data corresponding to the received first upstream packet to said subsequent downstream packet from said different sender, wherein said identifying said downstream flow identifier (ID) is performed without comparing said downstream address content from said subsequent downstream packet with said stored address contents.

2. The device of claim 1 where the device identifies the subsequently received first downstream packet based on rearranging data in a selective one of the received first upstream packet and the subsequently received first downstream packet.

3. The device of claim 2 where the subsequently received first downstream packet is identified using a hash of the rearranged data.

4. The device of claim 1 where the quality of service data written from the received first uspstream packet to at least one of the subsequently received downstream packets causes the at least one of the subsequently received downstream packets to be processed differently by the communications network than it would have been processed if the quality of service data had not been written to the at least one of the subsequently received downstream packets.

5. The device of claim 1 where the address contents of the subsequently received first downstream packet are located in a field of an IP header in the subsequently received first downstream packet.

6. The device of claim 1 where the device uses less time identifying the subsequent downstream packets than used to identify the subsequently received first downstream packet.

* * * * *